(12) United States Patent
Matsui

(10) Patent No.: US 9,545,058 B2
(45) Date of Patent: Jan. 17, 2017

(54) PLANT GROWTH PROMOTION DEVICE AND METHOD OF USING THE DEVICE

(71) Applicant: Tsugumitsu Matsui, Miyazaki (JP)

(72) Inventor: Tsugumitsu Matsui, Miyazaki (JP)

(*) Notice: Subject to any disclaimer, the term of this patent is extended or adjusted under 35 U.S.C. 154(b) by 0 days.

(21) Appl. No.: 14/001,100

(22) PCT Filed: Mar. 7, 2013

(86) PCT No.: PCT/JP2013/056320
§ 371 (c)(1),
(2) Date: Aug. 22, 2013

(87) PCT Pub. No.: WO2014/050167
PCT Pub. Date: Apr. 3, 2014

(65) Prior Publication Data
US 2015/0189839 A1    Jul. 9, 2015

(30) Foreign Application Priority Data
Sep. 27, 2012   (JP) ................... 2012-230306

(51) Int. Cl.
*A01G 7/04*   (2006.01)
*A01G 1/00*   (2006.01)

(52) U.S. Cl.
CPC ............. *A01G 7/04* (2013.01); *A01G 1/001* (2013.01)

(58) Field of Classification Search
CPC ........................................... A01G 7/04
USPC ........................................... 47/1.3
See application file for complete search history.

(56) References Cited

U.S. PATENT DOCUMENTS

| 1,952,588 | A | * | 3/1934 | Golden | A01G 7/04 256/10 |
| 5,138,172 | A | * | 8/1992 | Kropp | 250/492.1 |
| 6,145,244 | A | * | 11/2000 | Hodko et al. | 47/1.3 |
| 6,413,399 | B1 | * | 7/2002 | Kasevich | A01B 47/00 204/515 |

FOREIGN PATENT DOCUMENTS

| DE | 4345148 A1 | * | 12/1994 | A01G 9/02 |
| EP | 218538 A1 | * | 4/1987 | A01G 7/04 |
| JP | 05-068434 | | 3/1993 | |
| JP | 08056490 A | * | 3/1996 | A01G 7/04 |
| JP | 10-313685 | | 12/1998 | |
| JP | 2000324910 A | * | 11/2000 | A01C 1/00 |
| JP | 2002334804 A | * | 11/2002 | H01F 7/02 |
| JP | 2005313135 A | * | 11/2005 | C02F 1/48 |
| JP | 2008-061614 | | 3/2008 | |

OTHER PUBLICATIONS

Machine translation of JP 08056490A.*
Machine translation of JP 2005313135A.*
Machine translation of EP 0218538.*

* cited by examiner

*Primary Examiner* — Son T Nguyen
(74) *Attorney, Agent, or Firm* — Norris McLaughlin & Marcus, P.A.

(57) ABSTRACT

A plant growth promotion device includes: a flat-plate rotor, a motor coupled to the rotor by a rotary shaft, and a plurality of permanent magnets fixed in place at arbitrary intervals within the rotor, the rotor being rapidly rotatable by the rotary shaft that is coupled to the motor, so as to produce an alternating magnetic field. The device is used by situating and operating it in an agricultural field of crops so that the alternating magnetic field is produced in the agricultural field.

8 Claims, 7 Drawing Sheets

PLANT GROWTH PROMOTION DEVICE AND METHOD OF USING THE DEVICE

BACKGROUND OF THE INVENTION

The present invention relates to a device and the use thereof in which permanent magnets are used to change the magnetic field in an agricultural field so as to promote the growth of plants, and in particular crops such as fruits, and to contribute to improved flavor.

Toward the end of the 16th century, the Englishman W. Gilbert scientifically established that the earth is one giant magnet. That is to say, all living things on the earth live bathed in geomagnetism. Iron absorbs magnetism one hundred times to several thousand times more readily than air. It is of note that the energy of geomagnetism in the natural environment in the vicinity of Japan is approximately 0.5 gauss. Here, it has been indicated that, in environments resulting from civilization (high-rise buildings, condominiums, automobiles, greenhouses and the like) plants and animals are in a living environment that is surrounded by iron and the like, where a pathological condition that may be referred to as "magnetic deficiency syndrome" exists.

It is said that, when the geomagnetism is artificially blocked, there are clear changes in the central nervous systems and the circadian rhythms of humans. Accordingly, it would not be unusual to observe some sort of effect due to magnetism in life forms other than humans. It has long been known that one of these is the growth promoting effect of magnetism on plants.

For example, it is disclosed in JP-05-088434-A that magnetism of 20 to 85 gauss is effective in promoting the growth of plants. Furthermore, a method has been proposed for causing the roots and stems of plants to grow large by way of exposing the stems and roots of plants to a magnetic environment of 2 to 20 gauss and preferably 5 to 12 gauss and, as a result, improving the absorption of water and nutrients, so that the blossoming periods of flowers are extended, and the growth of leaves and fruits is promoted (see JP-10-313685-A). Furthermore, a crop cultivation promotion device has been proposed having a configuration wherein the bodies of organisms, as well as useful microorganisms within these bodies, and exterior to these bodies, are activated and the growth thereof is promoted on the basis of the "magneto-protonics principle" (see JP-2008-061614-A).

SUMMARY OF THE INVENTION

In context of the present invention as well, earnest research was undertaken with a view to producing the conditions for growing better crops using magnetism, so as to promote the growth of crops having good flavor and high quality, and so as to increase yields.

First, the present inventor focused on the fact that organisms living on the earth have a compass-like function that responds to geomagnetism, to a greater or lesser extent. For example, magnetic bacteria have magnetite particles within their bodies, like the magnetotactic bacteria discovered in the 1960s. Furthermore, it has been found that magnetic bacteria living in the northern hemisphere move towards the South Pole, while magnetic bacteria living in the southern hemisphere move towards the North Pole. Furthermore it can be considered that magnetic substances present in migratory fish, fish that return to their spawning grounds, insects, migratory birds and the like contribute to homing instincts.

The effect of promoting the growth of plants by way of magnetic action can be explained by the activation of growth hormones such as auxin (a plant growth hormone that promotes the elongation of plant cells in small quantities, enhances cell differentiation, promotes the formation of roots, prevents the formation of abscission layers, and influences the formation of wound healing tissue and the like), in addition to which, auxin plays a major role in fruition, as auxin is increased in pollinated and fertilized pistil ovaries. Furthermore, it has been found to contribute to the phototropism and geotropism in plants. Next, it has also been confirmed that this is sensitive to magnetism.

Hormones such as auxin and various enzymes are important substances involved in metabolism, and when the states of atoms that make up materials are excited by some form of external energy, reactions such as metabolic reactions occur more readily. This is referred to as "activation," and it is considered that, just as in the activation of hormones and enzymes by way of light energy, the same effect is produced by "magnetic energy."

Here, by rotating permanent magnets (static magnetic fields) so as to repetitively and alternatingly generate N and S magnetic fields, which are properties of the magnets, and thus produce alternating N/S magnetic fields in an agricultural field for plants, a dynamic magnetic field is brought about, so as to produce alternating magnetic fields and pulsed magnetic fields. Next, it can be assumed that, by way of radiating the magnetic flux lines of the same, water, crops and fruits placed within the magnetic fields will be taken from a low-energy state (base state) to a high energy state (excited state), and the flavor will be improved and the freshness extended.

The growth of plants is influenced by the earth's magnetic field (geomagnetism), and it has been reported that plants experience a more comfortable environment when their roots grow in a southerly direction; for example, if one establishes environments in which root shoots that extend from maize embryos are oriented toward the north pole or toward the south pole of the earth magnetic field, and one examines subsequent growth, those roots oriented toward the south pole will extend in a straight and healthy manner, while those oriented toward the north pole will extended in a shape that is inverted at the very beginning, so as to ultimately be oriented toward the south pole, with a U-turn shape. That is to say, it has been reported that the roots of plants have been shown to grow oriented in the direction of the South Pole (magnetic S pole).

Furthermore, oxygen is an element that has strong paramagnetism (the property of taking on magnetism) and it has been reported that plants have been made healthy as a result of activating oxygen by way of arbitrarily providing magnetic fields in the surroundings of an agricultural field, because this prevents root rot in plants caused by insufficient supply of oxygen.

The present invention is a reflection of the conventional technical problems described above and an object thereof is to provide a plant growth promotion device having a simple configuration, which can promote the growth of good tasting, high quality crops.

In order to achieve this object, a first feature of the plant growth promotion device of the present invention is that of comprising: a flat-plate rotor; and a motor coupled to this rotor by a rotary shaft, wherein a plurality of permanent magnets are configured so as to be fixed in place at arbitrary intervals within the rotor, and the rotor is rapidly rotated by the rotary shaft that is coupled to the motor, so as to produce a N/S alternating magnetic field within an agricultural field for crops.

Furthermore, the device is characterized in that a plurality of permanent magnets are arranged in the flat-plate rotor with S poles and N poles vertically stacked.

Next, the plant growth promo on device according to the present invention is such that that the drive energy is from a commercial power source or a power source using natural energy such as solar electricity, hydroelectricity or wind generated electricity.

Moreover, this is characterized by comprising an electromagnetic conductor, the top end of which is arranged in the vicinity of the flat-plate rotor, and the bottom end of which is buried in the soil, and a metal band, which extends running from the center of the alternating magnetic field in the direction of the South Pole.

The plant growth promotion device of the present invention has the following excellent effects.

(1) Good tasting high-quality crops can be produced stably and economically.
(2) Little is required in the way of running costs because the only electric power used is that used to rotate the rotor, and thus a small amount of electric power consumption suffices.
(3) Because the structure is simple, consisting simply of arranging permanent magnets on a flat-plate rotor and rotating this, it is not dangerous to humans, it is not likely to break, and it is easy to maintain.
(4) By providing a magnetic conductor, the top end of which is arranged in the vicinity of the flat-plate rotor and the bottom end of which is buried in the soil, good crop cultivation conditions can be achieved.
(5) If this device is used in reverse, there is an effect of inhibiting plant growth.

DETAILED DESCRIPTION OF THE INVENTION

In the present invention, alternating N/S magnetic fields are created in the surroundings of crops in an agricultural field, by way of rapidly rotating a flat-plate rotor on which permanent magnets having strong magnetism are arranged.

Permanent magnets of 3000 gauss or more at the surface such as, for example, neodymium magnets or samarium magnets, are preferably used for the permanent magnets. The permanent magnets are rotated at several hundred rpm or more.

Figure 1:
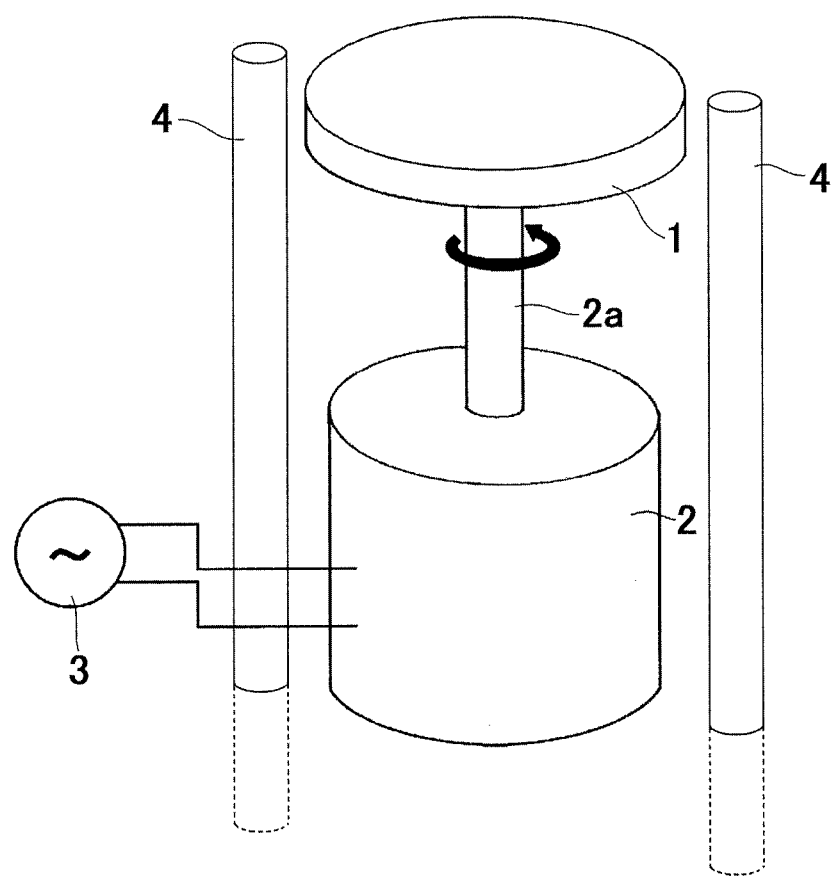
FIG. 1 is a perspective view showing one embodiment of the plant growth promotion device according to the present invention.
Figure 2A:
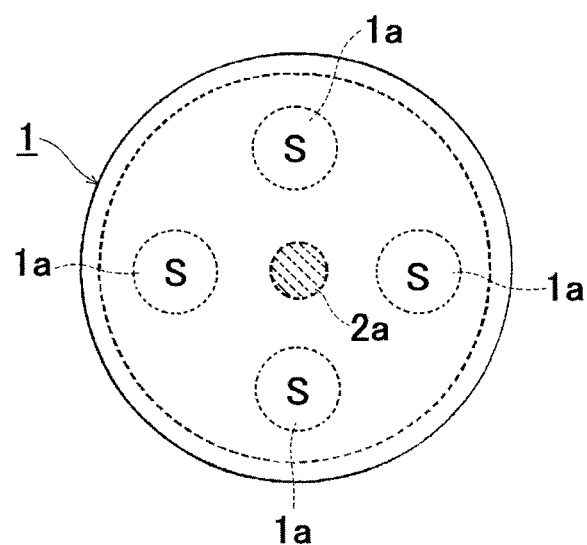
FIG. 2 (A) is a plan view showing an example of the arrangement of the permanent magnets within the rotor; and 2(B) is a side view thereof.
Figure 2B:
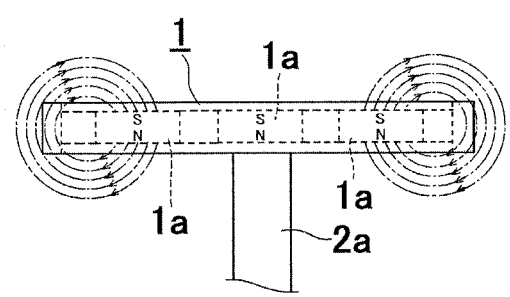

FIG. 1 is a perspective view showing one embodiment of the plant growth promotion device according to the present invention, and in FIG. 2 (A) is a plan view showing an example of the arrangement of the permanent magnets in the rotor, while 2(B) is a side view thereof.

The plant growth promotion device of the present invention comprises a flat-plate rotor 1 and a motor 2, which is coupled to this rotor 1 via a rotating shaft 2a; and a plurality of permanent magnets 1a are fixed in place at arbitrary intervals within the rotor 1.

Figure 3A:
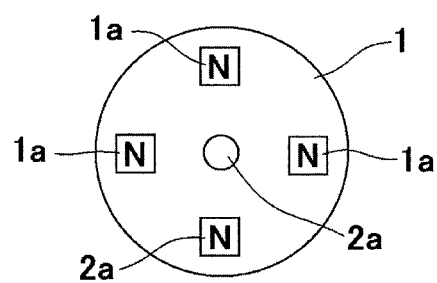
FIG. 3 (a) is a plan view showing an example of the arrangement of the permanent magnets within the rotor; and 3(b) is a side view thereof.
Figure 3B:
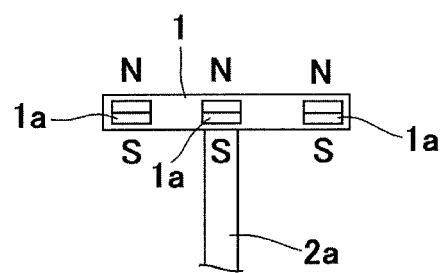

The permanent magnets 1a are arranged at uniform intervals following along the circumference of the rotor 1. In this embodiment, a plurality of permanent magnets 1a in which the N and S poles are vertically stacked are arranged (in four locations) in the flat-plate rotor 1. Note that the magnets 1a may be arranged so that the N and S poles thereof are alternatingly positioned, or may be arranged so that like poles are adjacent to each other, as shown in FIG. 3. The number of magnets arranged is arbitrary. The rotor 1 is rapidly rotated by the rotary shaft 2a, which is coupled to the motor 2. Note that, in this embodiment, a commercial power source 3 is used for the power source of the motor 2, but it is a matter of course that it is advantageous to use natural energy such as sunlight, water power or wind power as the power source.

Experiments were conducted in an agricultural field for strawberries, provided with a vinyl greenhouse covering. The experimental conditions and results are shown below.
Location of the agricultural field: Oazakaeda region in Miyazaki-shi
Area of the agricultural field: 20 are
Crop: strawberries (variety: sagahonoka)

The plant growth promotion device was first operated from May 12 to May 15 of 2008, and was operated for a second time from May 20, 2008 onward.
Thysanoptera (thrips): The appearance of the insects was later than in average years, and the number of insects was approximately 20% that of average years.
Whiteflies: Almost no occurrence. The number of insects was approximately 10% that of average years.
Mites: Occurrence could not be found.

May 7 of the same year: It was necessary to apply the organic phosphate type insecticide, Marathon (trade name; made by Sumitomo Chemicals KK) diluted 2000 times in water and Dani Saraba (product name, made by Otsuka Chemical Co. Ltd.), which is a wettable cyflumetofen powder, diluted 1000 times in water. However, as of May 31 of the same year, it sufficed to apply Mosupiran (product name; made by Nihon Nohyaku Co., Ltd.), the main ingredient of which is acetamiprid, which is an aphid and leaf miner insecticide, diluted 4000 times. This is an agricultural chemical that is normally applied diluted 2000 times.

Thus, as a result introducing the device of the present invention, not only were strawberries with higher sugar levels and fresher coloring than conventional harvested, but remarkable effects were observed in so much as the appearance of harmful insects was markedly suppressed, and it was possible to greatly reduce the amount of agricultural chemicals used. Consequently, it was possible to reduce the costs of agricultural chemicals for the agricultural field to approximately one quarter. Furthermore, according to the owner of the field, there was a remarkable uptake of leaf water by new shoots. Secondary advantageous effects were also reported, in so much as the air within the agricultural field was fresh.

Figure 4A:
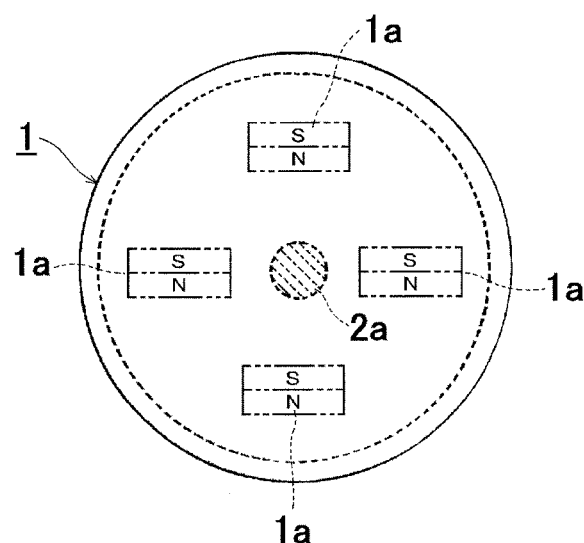
FIG. 4 is a schematic view illustrating the situation in which a metal band has been attached to the plant growth promotion device.
Figure 4B:
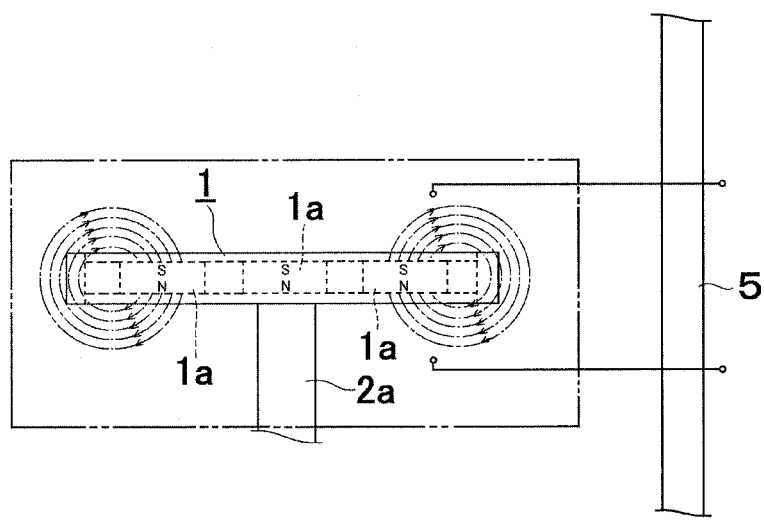
Figure 5:
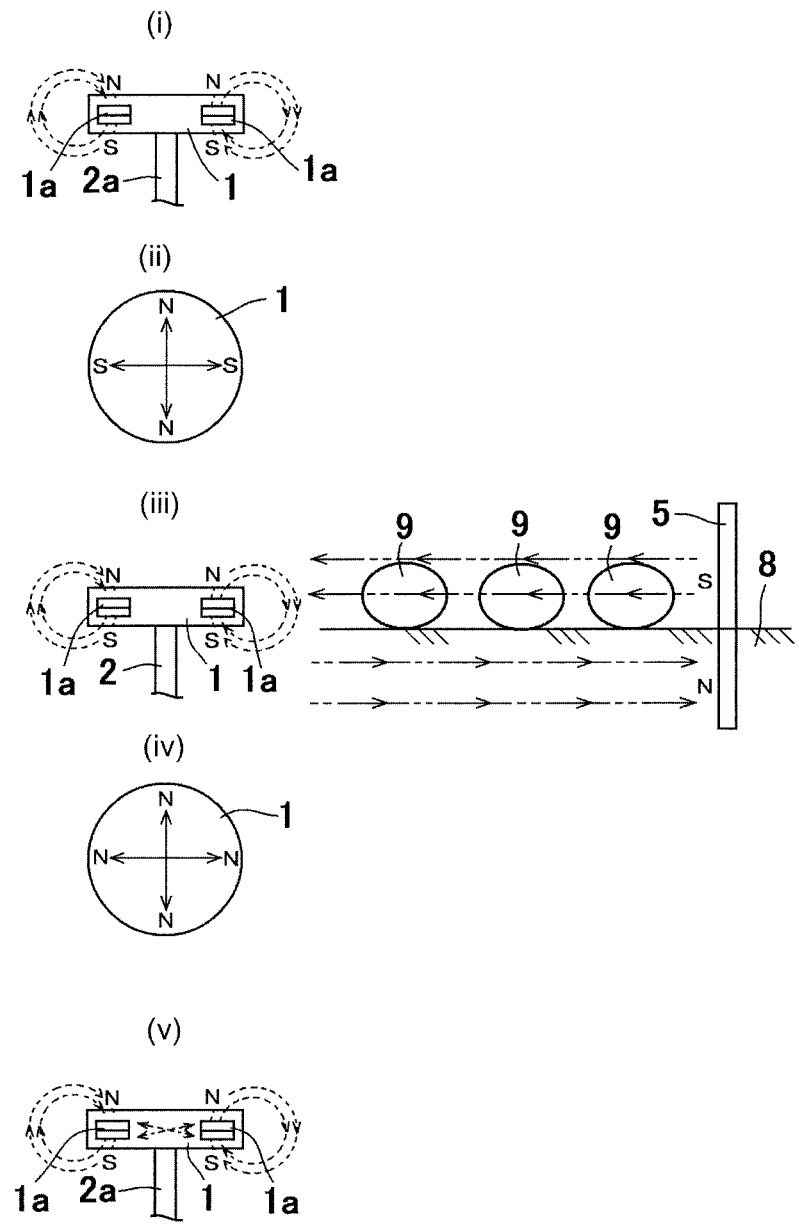
FIG. 5 is a schematic view illustrating the operating states of the plant growth promoting device.
Figure 6:
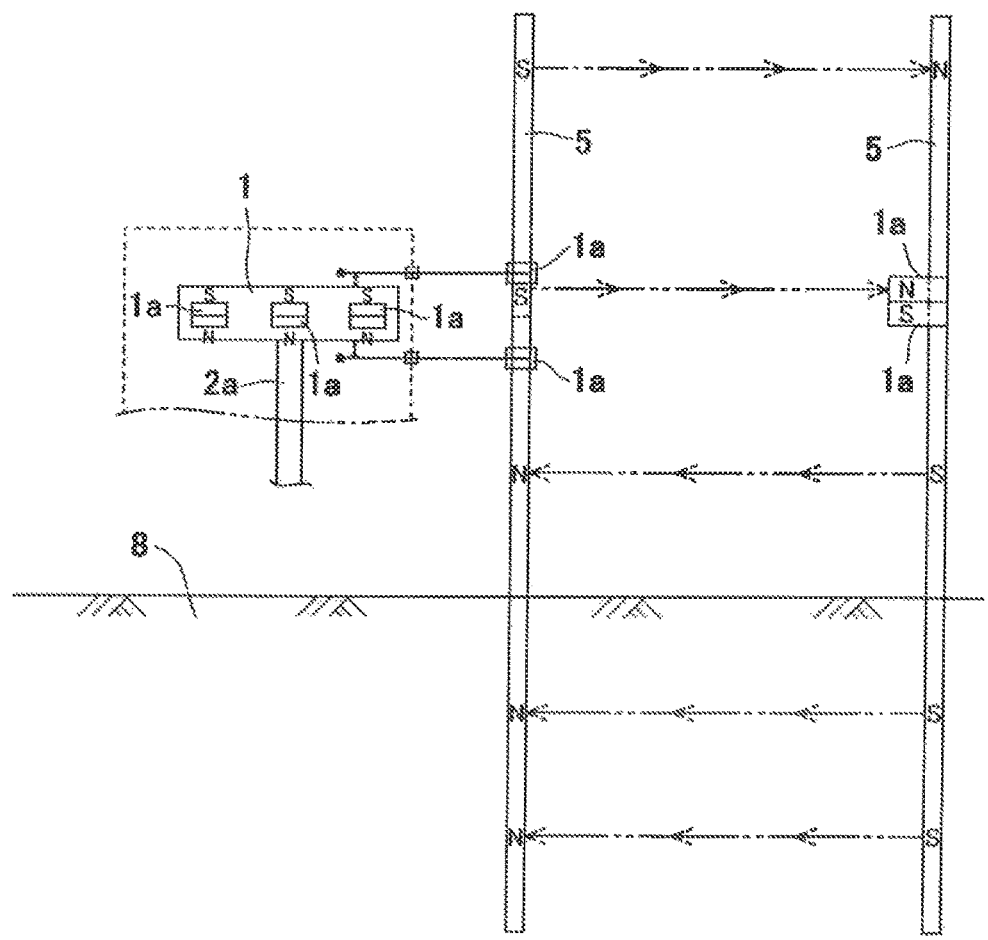
FIG. 6 is a side view schematically illustrating the situation in which the plant growth promoting device has been disposed in an agricultural field.
Figure 7:
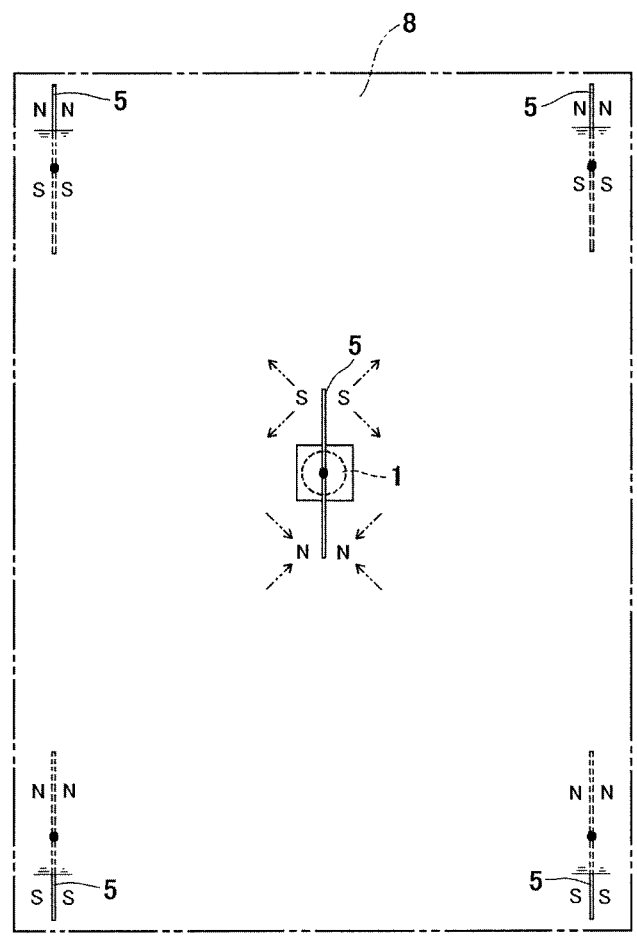
FIG. 7 is a plan view schematically illustrating the situation in which the plant growth promoting device has been disposed in an agricultural field.

Furthermore, it was found that, by providing the device of the present invention with a magnetic conductor (metal rod) 4, the top end of which is arranged in the vicinity of the flat-plate rotor 1 and the bottom end of which is buried in the soil, good conditions for raising a crop 9 (i.e., cultivated rows of individual plants 9) were achieved. It is assumed that this is due to the effect of the alternating magnetic fields on the roots of the crop. Note that, because a polarization inversion occurs with the rotor 1, it is preferable that at least one pair of magnetic conductors (metal rods) 4 be provided. Furthermore, it was understood that the cultivation environment was further improved by burying metal bands 5 at the four corners of the agricultural field 8, running at least approximately in the direction of the earth's magnetic South Pole from the center of the alternating magnetic field that is generated by the rotor 1, as shown in FIG. 3 to FIG. 5, so as to bring about propagation of air vibrations. Furthermore, transmission of vibrations into the atmosphere, transmission of vibrations into the soil (eradication of harmful insects in the soil) and the alternating/pulsed magnetic flux resulting from capturing vibrations act on the passive iron plate through the atmosphere; and interpreting the self-magnetic field lines as an alternating magnetic field, the interference magnetic force lines as a pulsed magnetic field, and the S-S and N-N repulsive magnetic field lines as pulses, it is possible to positively produce the South Pole oriented magnetic field of the earth that has a beneficial effect on the cultivation of plants. (Of course, if the agricultural field were instead in the South Hemisphere, the metal bands 5 would be arranged to be running at least approximately in the direction of the earth's magnetic North Pole.)

It is of note that the carbon content of plants is understood by the general formula $C_n(H_2O)_m$, these contain many nutrients, and the water content of these vegetables is several tens of percent or more in most cases. Water is a chemical compound made up of "hydrogen" and "oxygen," resulting from one oxygen atom and two hydrogen atoms, referred to as "$H_2O$." Water molecules are bent at an approximately 90° angle around the oxygen, and consequently the apex of the approximately 90° angle is somewhat negatively (−) charged, while the two extremities are somewhat positively charged (+), thus the overall molecule is electrically polar, and as a result of this polarization the water molecules are electrically connected, forming a special network structure. Ordinary water is not a collection of independent molecules, but rather these are present as molecule groups known as "clusters," Under certain conditions regular 12-sided "cage type" structures are even formed.

The present device is directed at extending the freshness of plants with magnetized water in which the water ($H_2O$) molecules have been activated as described above. Furthermore, this is directed at improving flavor by primary, secondary or indirect enhancement of the reactivity of substances. That is to say, it is assumed that the flavor is improved by activating the following components, which are contained by crops.

Fructose (C6H12O6): a type of disaccharide
Glucose ($C_6H_{12}O_6$): produced by hydrolysis of starch and glycogen. An important substance positioned at the center of the energy metabolism of plants and animals, which is distributed in large amounts within sweet fruits in a free state dissolved in water, and which demonstrates reducing properties. (D-glucose).
Maltose ($C_{12}H_{22}O_{11}$): Also referred to as malt sugar, this is a reducing disaccharide in which two glucose molecules are α-1,4 bonded. It is found in the leaves of plants, malt, honey and the like. It is produced by hydrolysis of starch by amylase, and if subject to further hydrolysis by maltase and acids, it renders two glucose molecules. It is a well-absorbed calorie source.
Starch (a type of polysaccharide): A glucose (D-glucose) polymer. Approximately 20% is constituted by the straight chain polymer amylase, and approximately 80% is constituted by amylopectin, which is highly branched. It is made by photosynthesis in the chloroplasts of green plants.
Amylases: The general term for enzymes that hydrolyze starch and glycogen into primarily maltose and dextrin. They are classified into alpha type, beta type or glycosylated type, depending on the mode of action.
Amino acids: The general term for organic compounds having the basic amino group —$NH_2$ and the acidic carboxyl group —COOH. They are constituent units in proteins, and are produced by hydrolysis of proteins.
Proteins: Nitrogen-containing organic compounds, which are important as constituent components of living organisms, and which can take primary through quaternary structures as polypeptides wherein 20 types of L-alpha-amino acids are condensed in great numbers by way of peptide bonds (—CO—NH—). All of them play fundamental roles in life phenomena, for example, as various hormones and antibodies.

The device of the present invention is particularly useful as a plant growth promotion device in greenhouse culture in the field of agriculture, which is highly practical and extremely useful.

The invention claimed is:

1. A plant growth promotion device comprising:
(A) a flat-plate rotor;
(B) a motor functionally coupled to the rotor via a rotary shaft rotatable around an axis of rotation;
(C) a plurality of permanent magnets fixed in place at arbitrary intervals within the rotor;
(D) an electromagnetic conductor, a top end of which is arranged in the vicinity of the flat-plate rotor, and a bottom end of which is configured to be buried in soil in an agricultural field of crops; and
(E) a plurality of metal bands configured to be situated in the agricultural field, said plurality of metal bands having a first portion thereof configured to be exposed to the air and a second portion thereof configured to be buried in the agricultural field; and
wherein
(i) the flat-plate rotor and the rotary shaft share the same axis of rotation, said axis of rotation runs through both the rotary shaft and the flat-plate rotor;
(ii) the rotor is rapidly rotatable around the axis of rotation by the rotary shaft, each of said rotary shaft being coupled to the motor, so as to produce a north (N)/south (S) alternating magnetic field within the agricultural field;
(iii) the plurality of metal bands are configured to be situated in the agricultural field so as to receive magnetic flux from the permanent magnets while the rotor is rotating, the plurality of metal bands being oriented toward one of Earth's magnetic poles, so as to capture Earth's magnetic field vibrations; and
(iv) a first metal band among the plurality of metal bands is configured so that it extends through a center of the alternating magnetic field generated by the rotor in approximately a direction of a magnetic pole of Earth in a hemisphere of Earth opposite the hemisphere in which the agricultural field is located.

2. The plant growth promotion device according to claim 1, wherein the permanent magnets are arranged in the flat-plate rotor with S poles and N poles vertically stacked.

3. The plant growth promotion device according to claim 2, wherein the motor is adapted to be driven by energy from a commercial power source or a power source using solar electricity, hydroelectricity or wind generated electricity.

4. The plant growth promotion device according to claim 1, wherein a portion of the first metal band is configured to be placed underground so as to capture Earth's magnetic field vibration, as well as receive magnetic flux from both the permanent magnets' rotation and vibrations in the air.

5. The plant growth promotion device according to claim 1, wherein the axis of rotation is substantially perpendicular to a surface of the agricultural field.

6. A method for plant growth promotion, comprising situating the device of claim 1 in an agricultural field of crops and rapidly rotating the rotor so as to produce a N/S alternating magnetic field within the agricultural field.

7. A method for plant growth promotion, comprising situating the device of claim 2 in an agricultural field of crops and rapidly rotating the rotor so as to produce a N/S alternating magnetic field within the agricultural field.

8. A method for plant growth promotion, comprising situating the device of claim 3 in an agricultural field of crops and rapidly rotating the rotor so as to produce a N/S alternating magnetic field within the agricultural field.

* * * * *